June 26, 1951 P. D. HUTTON 2,558,562
FLUID POWERED WHEELED AUTOMOTIVE VEHICLE
Filed Aug. 20, 1949 2 Sheets-Sheet 1
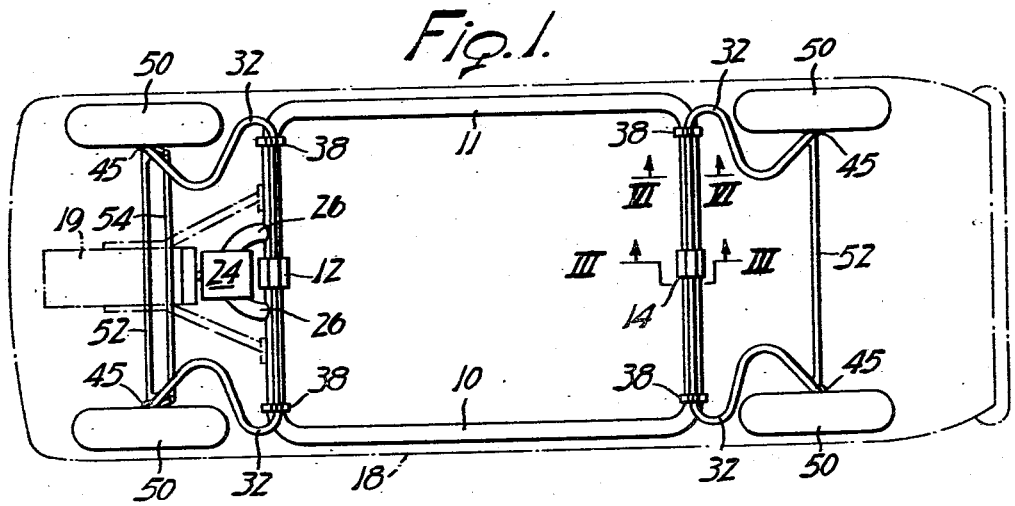
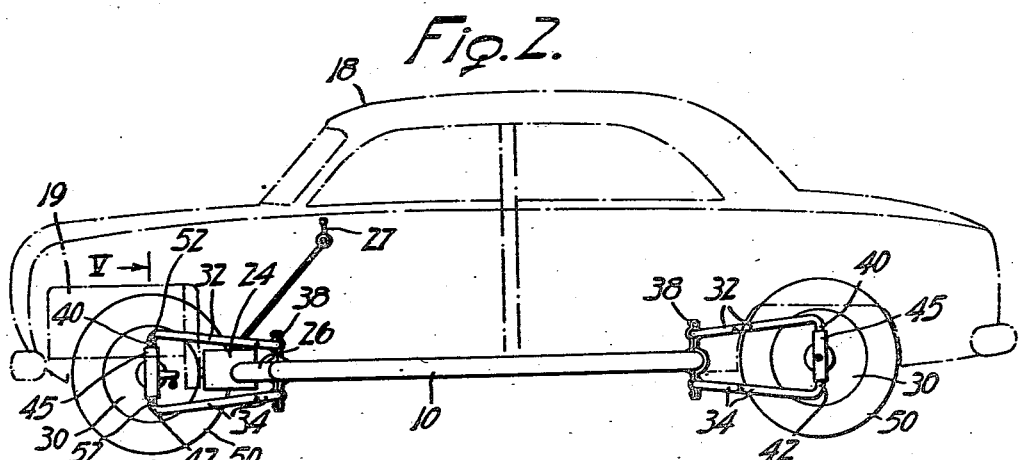
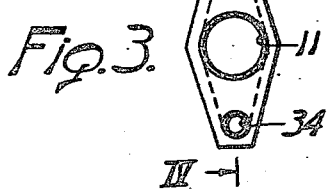
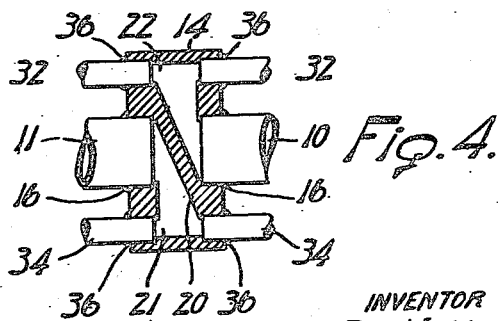
INVENTOR
Percy D. Hutton
BY
Bean, Brooks, Buckley, Bean.
ATTORNEYS

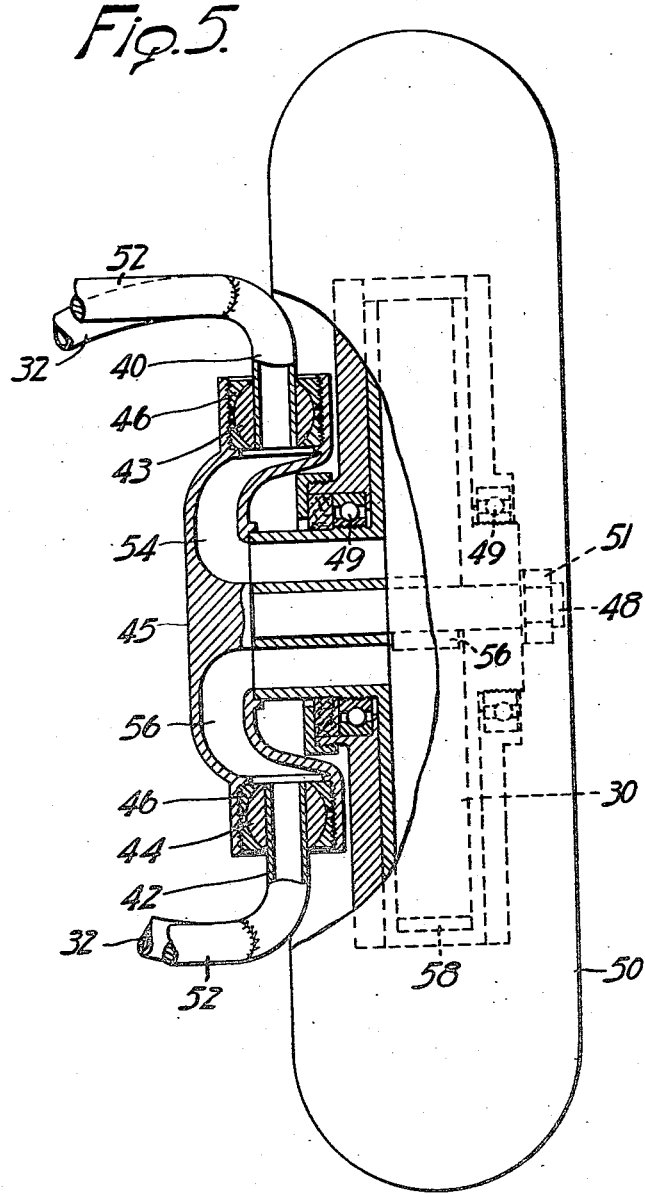
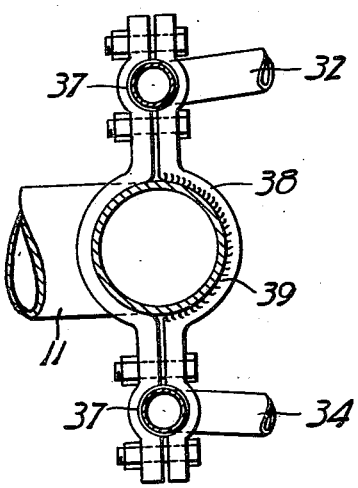

Patented June 26, 1951

2,558,562

UNITED STATES PATENT OFFICE 2,558,562

FLUID POWERED WHEELED AUTOMOTIVE VEHICLE

Percy D. Hutton, Buffalo, N. Y.

Application August 20, 1949, Serial No. 111,485

10 Claims. (Cl. 180—45)

This invention relates to automotive vehicles, and more particularly to improvements in vehicle chassis and power transmission arrangements therein.

One of the objects of the invention is to provide an improved power supply and transmission system in automotive vehicles.

Another object of the invention is to provide an improved chassis frame and wheel suspention arrangement in automotive vehicles.

Another object of the invention is to provide an improved automotive structure wherein the chassis frame elements function also as power transmission means and wheel suspension means therefor.

Another object of the invention is to provide an improved wheel spring suspension arrangement in automotive vehicles.

Other objects and advantages of the invention will appear from the specification hereinafter.

In the drawing:

Fig. 1 is a top plan view of a vehicle chassis of the invention;

Fig. 2 is a side elevation thereof;

Fig. 3 is a vertical section, on an enlarged scale, taken as along line III—III of Fig. 1;

Fig. 4 is a fragmentary section taken as along line IV—IV of Fig. 3;

Fig. 5 is a fragmentary section, on an enlarged scale, taken as along line V—V of Fig. 2; and Fig. 6 is a fragmentary section, on an enlarged scale, taken as along line VI—VI of Fig. 1.

In the drawings, the invention is illustrated as being embodied in a vehicle chassis which comprises a basic frame structure formed of tubular metal stock and rectangularly shaped in plan view. More specifically, the frame structure is fabricated of a pair of U-shaped tubular members 10—11 each having their opposite leg portions disposed in relative alignment and interconnected by means of junction boxes 12—14 so as to be maintained thereby to provide the generally rectangular frame structure. Fig. 4 for example illustrates in detail the junction box 14, and it is shown to comprise a casting or other suitable fabrication of box-like form which is apertured at its side walls to receive the ends of the frame tubes 10—11 in inserted relation therethrough. The tube ends are welded to the block as indicated at 16, or of course may be otherwise suitably fixed thereto; and thus it will be understood that the tube members 10—11 and the block members 12—14 cooperate to provide therebetween a frame structure which is substantially rigid against deflection in all directions so as to provide a suitable base upon which the automobile body 18 and engine 19 are mounted.

Although in the drawings herewith the body 18 is illustrated to comprise a specific design it will of course be understood that the body arrangement of the drawing is furnished by way of only one example thereof and that any other body style and arrangement may be provided as preferred. Also, it will be appreciated that whereas the engine 19 is illustrated as being disposed within the body hood portion over the front wheels of the vehicle, this illustration is by way of only one example of the engine mounting arrangement and that the engine may be otherwise mounted upon the chassis in any other preferred manner.

As illustrated in detail by Fig. 4, the junction block members 12—14 are each formed with internal partitions 20 so as to divide the interiors thereof into a pair of chambers such as are designated 21—22; the frame tubes 10—11 being mounted therein so that the tube 10 is in open communication with one chamber of the box while the tube 11 is in open communication with the other chamber thereof. A fluid pump is mounted upon the chassis at any convenient position thereon and for example may be mounted as indicated at 24 at a position nearby the engine 19. In any case the pump inlet and outlet ports will be connected as through conduits 26—26 (Fig. 1) into open communication with the frame tube members 10—11, respectively, so that the frame tube members 10—11 will alternately constitute the high and low pressure conduits for the system. The pump 24 may be of any desired style, but will of course be preferably of the variable displacement reversible direction type and coupled to the engine 19 so as to be driven thereby to circulate fluid through the frame conduit system at any desired rate and in any desired direction simply in response to operator adjustments of the pump control device such as is indicated at 27.

The wheel suspension and driving arrangement of the present invention comprises a unique tubular structure which is based upon the base frame to extend therefrom in cantilever relation so as to support the wheels with an improved springing action relative to the base. At the same time the wheel suspension structure functions to convey pressured fluid from the basic frame conduits to individual fluid pressure motors which are carried within each of the vehicle wheels as indicated diagrammatically for example at 30 in Fig. 5. It is to be understood that the motors 30 may be of any desired type and form and are not considered a part of the invention claimed in the present patent application, although I am concurrently filing a separate patent application covering a novel and preferred form of motor for this purpose.

In any case, the motors 30 will of course each require a fluid inlet and outlet connection to the frame conduits 10—11, and for that purpose, as shown in detail in Fig. 4, the junction blocks 12—14 have inserted thereinto paired tubular members 32—32 and 34—34 at the top and bottom portions, respectively, of the junction blocks. The tubular members 32—34 are welded as indicated at 36 to the junction blocks and are preferably fabricated of spring steel metal and the paired members are bent to extend in opposite directions from the junction blocks in parallel relation to the end sections of the basic frame through rotatable bearing connections as indicated at 37 with the corresponding upwardly and downwardly directed arm portions of split brackets 38. The brackets 38 are rigidly mounted upon the basic frame tubular members by welding as indicated at 39 (Fig. 6) so as to provide firm bearing support for the tubular spring members 32—34 while maintaining their root portions to extend alongside the basic frame members in parallel relation thereto.

Beyond the positions of the brackets 38 the spring members 32—34 are bent around and inwardly and thence into vertically turned end portions 40—42 (Figs. 2 and 5); the end portions 40—42 being fitted with ball-like bearing formations 43—44 which are press-fitted onto the ends of the members 32—32. King pin castings 45 are provided at their top and bottom end portions with bearing socket devices 46 (Fig. 5) which are threaded into the castings 45 so as to engage upon the ball portions 43—44 of the spring members 32—34 respectively. Thus, the king pin devices 45 are mounted between the outer ends of the paired spring devices 32—34 so as to be supported thereby in vertical attitude and to provide in combination therewith a truss-like structure which is inherently resilient and adapted to provide a novel springing suspension for the wheels relative to the basic frame.

For mounting the wheels upon the castings 45 the latter are formed with stub axle portions 48 and suitable bearings 49; the wheels being designated at 50. A lock nut is shown at 51 for holding each wheel assembly upon its axle 48, and it will of course be understood that the wheel axle and wheel hub and bearing assemblies may be of any desired type and form in lieu of the specific shape and arrangement thereof as shown in the drawing. In any case each wheel 50 mounts a rotary fluid motor device which is indicated diagrammatically at 30 in Fig. 5, and fluid inlet and outlet conduits 54—56 are formed within the castings 45 and in connection with the motor inlet and outlet ports respectively so that fluid entering and/or leaving through the conduits 32—34 will flow through the ball and socket bearing devices and the conduits 54—56 and thence through the motor.

Thus, the conduit spring elements 32—34 simultaneously provide an improved vehicle suspension system and function to convey fluid from the engine driven pump 24 to the individual motors 30 mounted within each of the wheels 50.

The universally rotatable ball and socket connections at 43—46 permit the spring elements 32—34 to flex as required for optimum springing suspension of the vehicle wheels. To relatively stabilize the paired wheels of the vehicle the outside end portions of the spring elements 32—34 are preferably interconnected by means of lateral brace members 52. It will of course be appreciated that steering may be accomplished by arranging for all four of the vehicle wheels to be steerable or only one pair thereof as may be preferred, and that the paired steerable wheels of the vehicle will be interconnected by a suitable tie-rod such as is indicated at 54 in Fig. 1, and controlled by a conventional steering knuckle arrangement as is well known in the art.

The motors 30 which are mounted within the wheels 50 may as stated hereinabove be of any desired form and style but in any case will preferably comprise generally concentric rotor and stator elements, the stator elements of which will be keyed to the corresponding wheel axle as indicated at 56 (Fig. 5). Then, the rotor elements of the motors 30 will be keyed to the corresponding wheel structures as indicated for example at 58, whereby it will be understood that upon operation of the pump controller (assuming that the engine 19 is in operation) a flow of pressured fluid through the hydraulic system will be initiated at the desired rate of flow and in the desired direction of flow through the conduit system so as to drive the vehicle in the desired direction and at the desired speed. Thus, the gradual movement of the control device 27 will cause the motors at the wheel devices to be powered to drive the vehicle, and of course the vehicle may be reversed by simple movement of the control lever so as to reverse the direction of output flow from the pump 24.

Thus, optimum acceleration braking and driving torque characteristics are obtainable without the use of any clutch and/or gear mechanism; the power from the engine being delivered through the pump and the hydraulic system to the four wheels of the vehicle with absolute uniformity of power application. It will of course be appreciated that the wheel suspension and power supply system of the invention will provide marked improvement in torque transmission efficiency, and that the simplification of the structural and mechanical parts necessarily involved constitutes a tremendous advantage in the case of the present invention compared to prior art power transmission and wheel suspension systems.

Although the invention has been illustrated and described in detail herein in connection with only one possible specific embodiment thereof, it will be understood that the invention may be employed in conjunction with any other type automotive vehicle and that various changes may be made in the constructional details as illustrated and described herein without departing from the spirit of the invention and the scope of the claims.

I claim:

1. An automotive vehicle comprising in combination, a chassis frame consisting of a pair of U-shaped tubular members having their legs arranged in opposed relation, a pair of junction boxes structurally interconnecting said members so as to provide therewith a chassis frame structure of generally rectangular plan form, said tubular members being internally blocked from communication with one another in the said junction boxes so that said tubular members constitute separate fluid conveying conduits, a pair of spring members formed of tubular metal stock arranged in cantilever mounted relation to extend from each side of each of said junction boxes above and below said tubular members and through rotatable bearing devices carried by said frame at the corner portions thereof and thence in directions longitudinally of said frame structure to extend forwardly and rearwardly thereof, the terminal ends of said spring members being provided with ball universal joint devices, a king pin device having universal joint socket connection means at its upper and lower ends arranged in pivotal connection with the ball end portions of each pair of said spring members, said king pin devices being internally bored to include a pair of fluid channels therethrough in open communication with the interiors of said spring devices when connected thereto, said king pin devices having axle portions extending laterally therefrom, a wheel rotatably mounted upon each of the said axles, a rotary fluid pressure motor mounted within each of said wheels and having the inlet-outlet ports thereof arranged in communication with said fluid passageways through said king pins, a fluid pressure pump carried by said vehicle and having its inlet and outlet ports separately connected in open communication with said frame tubular members respectively whereby fluid delivered from said pump will flow through said frame and thence through said spring members and said king pins and said motors, and thence return through said king pin and said spring members and said frame to said pump.

2. An automotive vehicle comprising in combination, a chassis frame consisting of tubular members structurally interconnected so as to provide a chassis frame structure of generally rectangular plan form, said tubular members being arranged to provide a pair of separate fluid conveying conduits, spring members formed of tubular metal stock in open communication with the interiors of said conduits and arranged in cantilever mounted relation upon said frame and arranged to extend in vertically aligned pairs therefrom, said spring members being provided at their terminal ends with universal joint connection devices, king pin devices having universal joint connection means at their upper and lower ends arranged in pivotal connection with each pair of said spring members, said king pin devices being internally bored to include a pair of fluid channels in open communication with said spring devices when connected thereto, and said king pin devices having axle portions extending laterally therefrom, a wheel rotatably mounted upon each of the said axles, rotary fluid pressure motor means mounted within each of said wheels and having the inlet-outlet ports thereof arranged in communication with said fluid channels through said king pin, a fluid pressure pump carried by said vehicle and having its inlet and outlet ports connected in open communication with said frame tubular members respectively, whereby fluid delivered from said pump will flow through said frame and thence through said spring members and said king pins and said motors, and thence back through said king pins and said spring members and said frame to said pump.

3. An automotive vehicle comprising in combination, a chassis frame consisting of a rectangular tubular structure constituting a pair of separate fluid conveying conduits, spring members formed of tubular metal stock arranged in cantilever mounted relation to extend from the corner portions of said frame structure, king pin devices arranged in pivotal connection with said spring members, said king pin devices being internally bored to include a pair of fluid channels in open communication with said spring devices when connected thereto, said king pin devices having axle portions extending laterally therefrom, a wheel rotatably mounted upon each of the said axles, rotary fluid pressure motor means mounted within each of said wheels and having the inlet-outlet ports thereof arranged in communication with said fluid channels through said king pins, a fluid pressure pump carried by said vehicle and having its inlet and outlet ports connected in open communication with said frame tubular members respectively, whereby fluid delivered from said pump will flow through said frame and thence through said spring members and said king pins and said motors, and thence back through said king pins and said spring members and said frame to said pump.

4. An automotive vehicle comprising in combination, a chassis frame consisting of tubular members structurally interconnected so as to provide a chassis frame of generally rectangular plan form, said tubular members being internally blocked so as to constitute a pair of separate fluid conveying conduits, spring members formed of tubular metal stock arranged in communication with the interiors of said conduits and in cantilever mounted relation to extend in pairs from said frame, axle devices arranged in pivotal connection with said spring members, said axle devices being internally bored to include a pair of fluid channels in open communication with said spring devices when connected thereto, a wheel rotatably mounted upon each of the said axles, rotary fluid pressure motor means mounted within each of said wheels and having the inlet-outlet ports thereof arranged in communication with said fluid channels through said axle devices, a fluid pressure pump carried by said vehicle and having its inlet and outlet ports connected in open communication with said frame tubular members respectively, whereby fluid delivered from said pump will flow through said frame and thence through said spring members and said axles and said motors, and thence back through said axles and said spring members and said frame to said pump.

5. An automotive vehicle comprising in combination, a chassis frame including tubular members, said tubular members being internally arranged to constitute a pair of separate fluid conveying conduits, spring members formed of tubular metal in open communication with said conduits and arranged in cantilever mounted relation upon said frame, axle devices having universal joint connection means arranged in pivotal connection with said spring members, said axle devices being internally bored to include a pair of fluid channels in open communication with said spring devices when connected thereto, a wheel rotatably mounted upon each of the said axles, rotary fluid pressure motor means mounted within each of said wheels and having the inlet-outlet ports thereof arranged in communication with said fluid channels through said axles, a source of fluid pressure carried by said vehicle and having its inlet and outlet ports connected in open communication with said frame tubular members respectively, whereby fluid delivered from said source will flow through said frame and thence through said spring members and said axles and said motors, and thence back through said axles and said spring members and said frame to said source.

6. An automotive vehicle chassis frame including a pair of U-shaped tubular members having their legs arranged in opposed relation, a junction box structurally interconnecting said members at the junctures of said opposed legs so as to provide therewith a chassis frame structure of generally rectangular plan form, said junction boxes being internally partitioned so that said tubular members constitute separate fluid conveying conduits, a pair of spring members formed of tubular metal stock arranged in cantilever mounted relation upon said frame to extend from the corner portions thereof in directions forwardly and rearwardly thereof, the interiors of said spring members being in open communication with the interiors of said tubular members, a wheel axle device having pivotal connection at its upper and lower ends with the end portions of said spring members, said axle devices being internally bored to include a pair of fluid channels therethrough in open communication with the interiors of said spring devices when connected thereto, a wheel rotatably mounted upon each of the said axles, a rotary fluid pressure motor mounted within each of said wheels and having the inlet-outlet ports thereof arranged in communication with said fluid channels through said axles, a fluid pressure pump carried by said vehicle and having its inlet and outlet ports separately connected in open communication with said frame tubular members respectively, whereby fluid delivered from said pump will flow through said frame and thence through said spring members and said axles and said motors, and thence return through said axles and said spring members and said frame to said pump.

7. An automotive vehicle comprising in combination, a chassis frame consisting of tubular members structurally interconnected so as to provide a chassis frame structure of generally rectangular plan form, said tubular members being arranged to provide separate fluid delivery and return conduits, a pair of spring members formed of tubular metal stock in open communication respectively with the interiors of said separate conduits and arranged in cantilever mounted relation upon said frame and arranged to extend in vertically aligned pairs therefrom, said spring members being provided at their terminal ends with universal joint connection devices, king pin devices having universal joint connection means at their upper and lower ends arranged in universally pivotal connection with each pair of said spring members, said king pin devices being internally bored to include a pair of fluid channels in open communication with said spring devices when connected thereto, and said king pin devices having axle portions extending laterally therefrom, a wheel rotatably mounted upon each of the said axles, rotary fluid pressure motor means mounted within each of said wheels and having the inlet-outlet ports thereof arranged in communication with said fluid channels through said king pin, a fluid pressure pump carried by said vehicle and having its inlet and outlet ports separately connected in open communication with said frame tubular members respectively, whereby fluid delivered from said pump will flow through said frame and thence through said spring members and said king pins and said motors, and thence back through said king pins and said spring members and said frame to said pump.

8. An automotive vehicle comprising in combination, a chassis frame consisting of a tubular structure constituting a pair of separate fluid conveying conduits, spring members formed of tubular metal stock arranged in cantilever mounted relation to extend from the corner portions of said frame structure, king pin devices arranged in pivotal connection with said spring members, said spring members and king pin devices being internally bored to include a pair of fluid channels in open communication with said fluid conveying conduits, said king pin devices having axle portions extending laterally therefrom, a wheel rotatably mounted upon each of the said axles, rotary fluid pressure motor means mounted within each of said wheels and having the inlet-outlet ports thereof arranged in communication with said fluid channels through said king pins, a fluid pressure pump carried by said vehicle and having its inlet and outlet ports connected in open communication with said frame tubular members respectively, engine means connected to said pump for driving the latter, and manual control means for regulating the output of said pump.

9. An automotive vehicle comprising in combination, a chassis frame consisting of tubular members structurally interconnected so as to provide a chassis frame of generally rectangular plan form, said tubular members being internally blocked so as to constitute a pair of separate fluid conveying conduits, spring members formed of tubular metal stock arranged in communication with the interiors of said conduits and in cantilever mounted relation to extend in pairs from said frame, axle devices arranged in pivotal connection with said spring members, said axle devices being internally bored to include a pair of fluid channels in open communication with said spring devices when connected thereto, a wheel rotatably mounted upon each of the said axles, rotary fluid pressure motor means mounted in conjunction with each of said wheels for driving the latter and having the inlet-outlet ports thereof arranged in communication with said fluid channels through axle devices, a fluid pressure pump carried by said vehicle and having its inlet and outlet ports connected in open communication with said frame tubular members respectively, and means for controlling operation of said pump.

10. An automotive vehicle comprising in combination, a chassis frame including tubular members, said tubular members being internally arranged to constitute a pair of separate fluid conveying conduits, paired spring members formed of tubular metal in open communication with different of said conduits respectively and arranged in cantilever mounted relation upon said frame, axle devices having universal joint connection means arranged in pivotal connection with said spring members, said axle devices being internally bored to include a pair of fluid channels in open communication with said spring devices when connected thereto, a wheel rotatably mounted upon each of the said axle devices, rotary fluid pressure motor means mounted in conjunction with each of said wheels and having the inlet-outlet ports thereof arranged in communication with said fluid channels through said axle devices, a source of fluid pressure carried by said vehicle and having its inlet and outlet ports connected in open communication with said frame tubular members respectively, and means for manually controlling the output of said fluid pressure source.

PERCY D. HUTTON.

REFERENCES CITED

The following references are of record in the file of this patent:

UNITED STATES PATENTS

| Number | Name | Date |
|---|---|---|
| 1,926,692 | Tarbox | Sept. 12, 1933 |
| 2,228,411 | Sheridan | Jan. 14, 1941 |